United States Patent [19]

Thompson

[11] Patent Number: 5,638,874

[45] Date of Patent: Jun. 17, 1997

[54] POSITIVE SEAL RETAINER FOR QUICK INSTALL FUEL CAP

[75] Inventor: Robert Harold Thompson, Redford, Mich.

[73] Assignee: Ford Motor Company, Dearborn, Mich.

[21] Appl. No.: 727,066

[22] Filed: Oct. 8, 1996

Related U.S. Application Data

[62] Division of Ser. No. 498,160, Jul. 5, 1995, Pat. No. 5,595,222.

[51] Int. Cl.$^6$ .................................................. B65B 1/04
[52] U.S. Cl. .................. 141/312; 141/301; 141/286; 220/86.2; 220/203.07; 137/588
[58] Field of Search ..................... 141/286, 301, 141/302, 304, 312; 220/203.05, 203.06, 203.07, 86.2, 366.1; 137/588

[56] References Cited

U.S. PATENT DOCUMENTS

| | | | |
|---|---|---|---|
| 4,044,913 | 8/1977 | Brunnert | 220/86 R |
| 4,625,777 | 12/1986 | Schmidt | 141/286 |
| 4,714,172 | 12/1987 | Morris | 220/86.2 |
| 4,739,808 | 4/1988 | Schmidt | 141/286 |
| 4,747,508 | 5/1988 | Sherwood | 220/86 R |
| 4,798,306 | 1/1989 | Giacomazzi et al. | 220/86.2 |
| 4,816,045 | 3/1989 | Szlaga et al. | 55/168 |
| 4,917,157 | 4/1990 | Gifford et al. | 220/86.2 |
| 4,932,444 | 6/1990 | Micek | 141/59 |
| 4,944,779 | 7/1990 | Szlaga et al. | 55/168 |
| 4,955,950 | 9/1990 | Seiichi et al. | 141/46 |
| 4,977,936 | 12/1990 | Thompson et al. | 141/312 |
| 5,029,722 | 7/1991 | Bollinger et al. | 220/86.2 |
| 5,320,147 | 6/1994 | Jamrog | 141/312 |
| 5,322,100 | 6/1994 | Buechler et al. | 141/312 |

*Primary Examiner*—Henry J. Recla
*Assistant Examiner*—Steven O. Douglas
*Attorney, Agent, or Firm*—Neil P. Ferraro; Roger L. May

[57] ABSTRACT

A fuel cap retainer and gas tank cap for a fuel tank filler tube is disclosed in which the fuel tank filler tube is sealed if the gas tank cap is not properly installed on the fuel cap retainer and when properly installed permits vapor pressure equalization in the fuel cap retainer. A baffle plate extends across the fuel tank filler tube near a distal end of the fuel tank filler tube. The baffle plate has a refueling opening into which a fuel filler nozzle is adapted to be received and a valve opening. A flap valve is spring biased into a closed position sealing the refueling opening. A movable valve element is associated with the valve opening and biased to a closed position in which the valve element seals the valve opening. The movable valve element is shiftable to an open position in which the valve element permits fluid flow through the opening. The gas tank cap has a structural element for holding the movable valve element in the open position only when the gas tank cap is properly installed. The flap valve and movable valve element seal vapor transmission from one side of the baffle plate to the other side when the gas tank cap is not properly installed on the distal end of the fuel tank filler tube. The removable valve element permits vapor pressure equalization on both sides of the baffle plate when the gas tank cap is properly installed on the distal end of the fuel tank filler tube so that a pressure relief valve in the gas tank cap can be actuated by pressure developed below the baffle plate.

2 Claims, 2 Drawing Sheets

POSITIVE SEAL RETAINER FOR QUICK INSTALL FUEL CAP

This is a divisional of application Ser. No. 08/498,160, filed on Jul. 5, 1995 now U.S. Pat. No. 5,595,222.

TECHNICAL FIELD

The present invention relates to a fuel cap retainer for vehicles which is sealed to prevent vapor release when the fuel cap is not properly installed.

BACKGROUND ART

Fuel tank caps are used to close the end of the fuel filler neck between occasions when a vehicle is refueled. Fuel tank caps include a pressure relief valve that is calibrated to prevent build-up of pressure in the fuel tank. Fuel tank caps are also designed to maintain the seal below a certain pressure to preclude leakage.

Recent regulations and regulatory test requirements have been established which have the objective of minimizing release of unburned hydrocarbons from mobile sources, such as vehicles. To meet these regulatory requirements, it has been suggested that onboard diagnostic leak detection hardware be provided on vehicles. Onboard diagnostic leak detection hardware is complex and expensive and can increase the cost of a motor vehicle without any corresponding benefit in the performance of a vehicle.

One approach to providing control of liquid/vapor discharge out of the fuel filler neck if the closure cap is either left off or not fully secured is disclosed in U.S. Pat. No. 5,320,147, which is assigned to the assignee of this application. U.S. Pat. No. 5,320,147, which issued to Jamrog, includes a module containing two one-way valves acting in opposite directions to provide vacuum-break and pressure relief, independent of the pressure relief valve in the fuel tank cap. The Jamrog system, while effective, requires considerable calibration of the valves. The complexity of the Jamrog system also adds to the cost of the vehicle.

Another disadvantage of some prior art fuel tank cap and retainer combinations is they are not user friendly, and require some dexterity and strength to properly install. To meet consumer demand for ease of operation, quick install fuel caps have been developed that are easy to install and are less likely to be improperly installed by a consumer.

SUMMARY OF THE INVENTION

The invention is directed to a quick install fuel cap and fuel cap retainer which is received in the filler neck of a vehicle fuel tank. The retainer includes a baffle plate extending across the fuel tank filler tube. The baffle plate has a refueling opening into which a fuel filler nozzle is adapted to be received. The refueling opening is closed by a flap valve which is spring biased into a closed position whenever the fuel filler nozzle is not inserted in the refueling opening. A valve opening is also provided in the baffle plate, which is closable by a movable valve element. The movable valve element is biased to a closed position in which the valve element seals the valve opening. The valve element is shiftable to an open position in which the valve element permits fluid and vapor flow through the valve opening. The gas tank cap has a pressure relief valve which is conventional in the prior art. The gas tank cap also has a structural element for holding the movable valve element in the open position when the gas tank cap is properly installed. The moveable valve element is closed whenever the gas tank cap is not properly installed on the distal end of the fuel tank filler tube. The movable valve element seals vapor transmission from one side of the baffle plate to the other when the gas tank cap is not properly installed on the distal end of the fuel tank filler tube. The movable valve element permits vapor pressure equalization on both sides of the baffle plate when the gas tank cap is properly installed on the distal end of the fuel tank filler tube so that the pressure relief valve in the gas tank cap can be actuated by pressure developed below the baffle plate. The structural element also opens the valve opening to permit any liquid fuel deposits on the external side of the baffle to drain through the valve opening into the fuel tank.

According to another aspect of the invention, the fuel tank cap retainer includes a movable valve element as described above, which is a poppet valve, having a spring biasing the poppet valve into a closed position. The poppet valve is shifted to an open position by the structural element provided on the gas tank cap. It should be readily appreciated by one of ordinary skill in the art that the present invention provides a simple and effective gas tank cap and retainer which can prevent vapor release when the cap is not installed or improperly installed. If unburned hydrocarbon vapors are released in such situations, it can eliminate the need for an onboard diagnostic leak detection system.

It is another advantage of the invention that there is no need to calibrate valves in the retainer which are redundant to the pressure relief valve in the gas tank cap.

Another advantage of the invention is that it prevents trapping of fuel on the external side of the baffle blade of the fuel cap retainer.

According to another aspect of the invention a fuel cap retainer and gas tank cap are provided for a fuel tank filler tube in which a baffle plate having a refueling opening which is closed by a flap valve. The flap valve is spring biased closed to seal the refueling opening. The flap valve is openable by the insertion of a fuel filler nozzle and is also openable by a structural element provided on the gas tank cap which is adapted to hold the flapper valve open only when the gas tank cap is properly installed on the fuel tank filler tube. The flapper valve remains closed whenever the gas tank cap is not properly installed on the fuel tank filler tube. By holding the flap valve open when the gas tank cap is properly installed, vapor pressure equalization on both the external and internal sides of the baffle plate is permitted so that a pressure relief valve in the gas tank cap can be actuated by pressure developed below the baffle plate.

These underlying problems are solved and objects are achieved by applicant's invention, which is illustrated on the attached drawings and described in the following description of the best modes below.

BEST MODE FOR CARRYING OUT THE INVENTION

Figure 1:
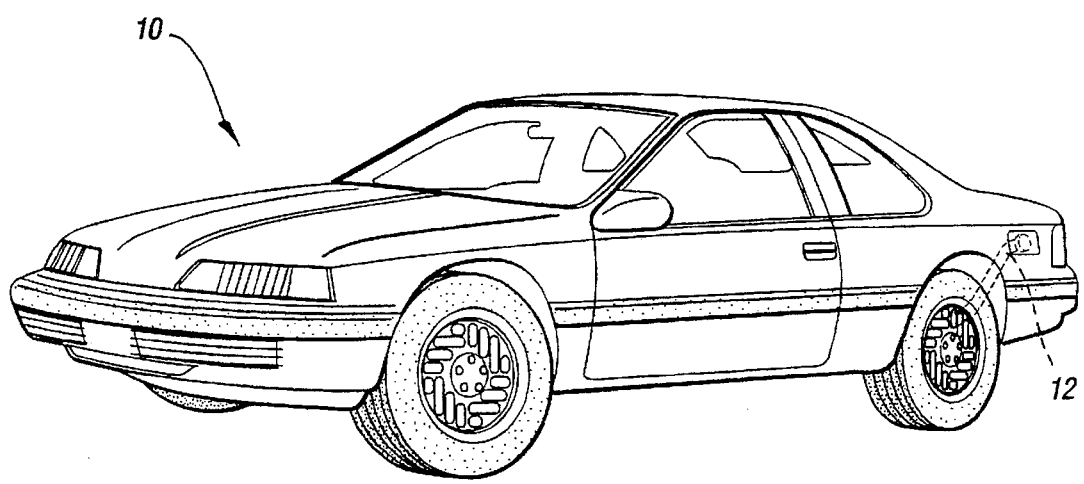
FIG. 1 is a perspective view of a vehicle showing the fuel tank filler tube with which the present invention can be applied.

Referring now to FIG. 1 a vehicle 10 having a fuel tank filler tube 12 suitable for utilization of the present invention is shown..

Figures 2, 3:
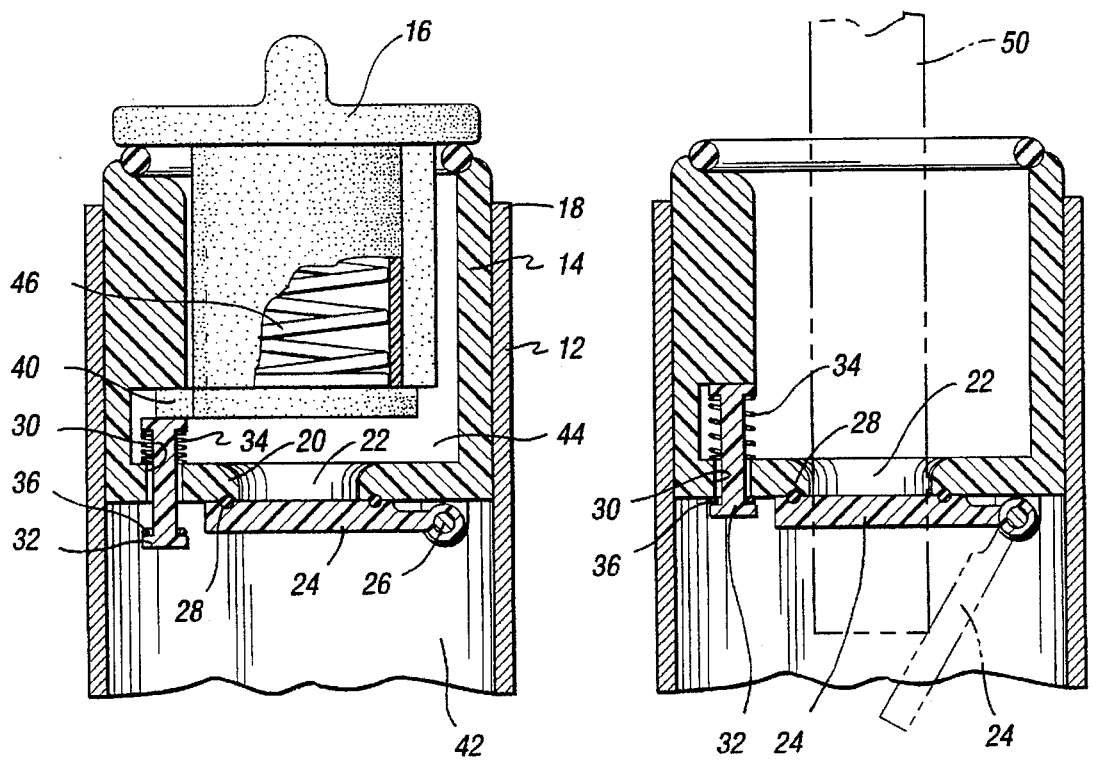
FIG. 2 is a cross-sectional view showing a fuel cap retainer and gas tank cap secured to a fuel tank filler tube.
FIG. 3 is a cross-sectional view showing a fuel cap retainer of the gas tank cap removed and a fuel filler nozzle inserted in the fuel tank filler tube.

Referring now to FIG. 2, a fuel cap retainer 14 and a fuel tank cap 16 made in accordance with the present invention are shown attached to a fuel tank filler tube 12. The fuel cap retainer 14 is affixed to the distal end 18 of the fuel tank filler tube 12. Baffle plate 20 forms part of the fuel cap retainer 14. The baffle plate 20 spans the fuel tank filler tube 12 near the distal end 18. Baffle plate 20 includes a refueling opening 22 which is closable by a flap valve 24.

Flap valve 24 includes a spring 26 which biases the flap valve 24 to a closed position, normally closing the refueling opening 22. A seal ring 28 is provided between the flap valve 24 and the refueling opening 22 to provide a vapor seal for the refueling opening 22 when the flap valve 24 is closed.

Baffle plate 20 also includes a valve opening 30. Valve opening 30 is preferably located in the vertically lower portion of the baffle plate 20. Valve opening 30 is adapted to be closed by a poppet valve 32, which includes a spring 34 that urges the poppet valve 32 into a closed position in which the valve opening 30 is closed. A seal ring 36 is preferably provided between the poppet valve 32 and the valve opening 30 to effect a vapor seal of the valve opening 30 by the poppet valve 32.

The fuel tank cap 16 includes a lug 40, or other structural element, which operatively engages the poppet valve 32 to shift into an open position wherein the valve opening 30 is opened to permit vapor or liquid flow through the valve opening 30. Vapor flow is permitted through the valve opening 30 to permit equalization of vapor pressure between the internal side 42 and the external side 44 of the baffle plate 20. Liquid flow through the valve opening 30 is intended to allow any excess liquid fuel deposited on the external side 44 of the baffle plate 20 to drain into the fuel tank filler tube.

The fuel tank cap 16 includes a pressure relief valve 46. Pressure relief valves 46 are conventional in fuel tank caps and are provided to regulate pressure within the fuel tank to a range of generally between 1.5 psi and 2 psi.

Referring now to FIG. 3, the present invention is shown wherein the fuel cap retainer 14 is shown with a fuel tank cap 16 removed and a fuel filler nozzle 50 is inserted into the refueling opening 22. The flap valve 24 is forced open by the fuel filler nozzle 50 and popper valve 32 is held in its closed position by spring 34 so that seal ring 36 seals the valve opening 30 to prevent escape of hydrocarbon vapor during the refueling operation.

After refueling is completed, the fuel filler nozzle 50 is removed and the fuel tank cap 16 can be reinserted as shown in FIG. 2 so that the structural element or lug 40 depresses the poppet valve 32, thereby opening the valve opening 30.

The present invention is suitable for inclusion in a quick install fuel cap, wherein the lug 40 is adapted to be received in a bayonet mount guide slot (not shown). An example of a commercially available fuel cap is a One-eighth turn fuel cap Model No. F5DC which is available from Stant Corporation.

Figure 4:
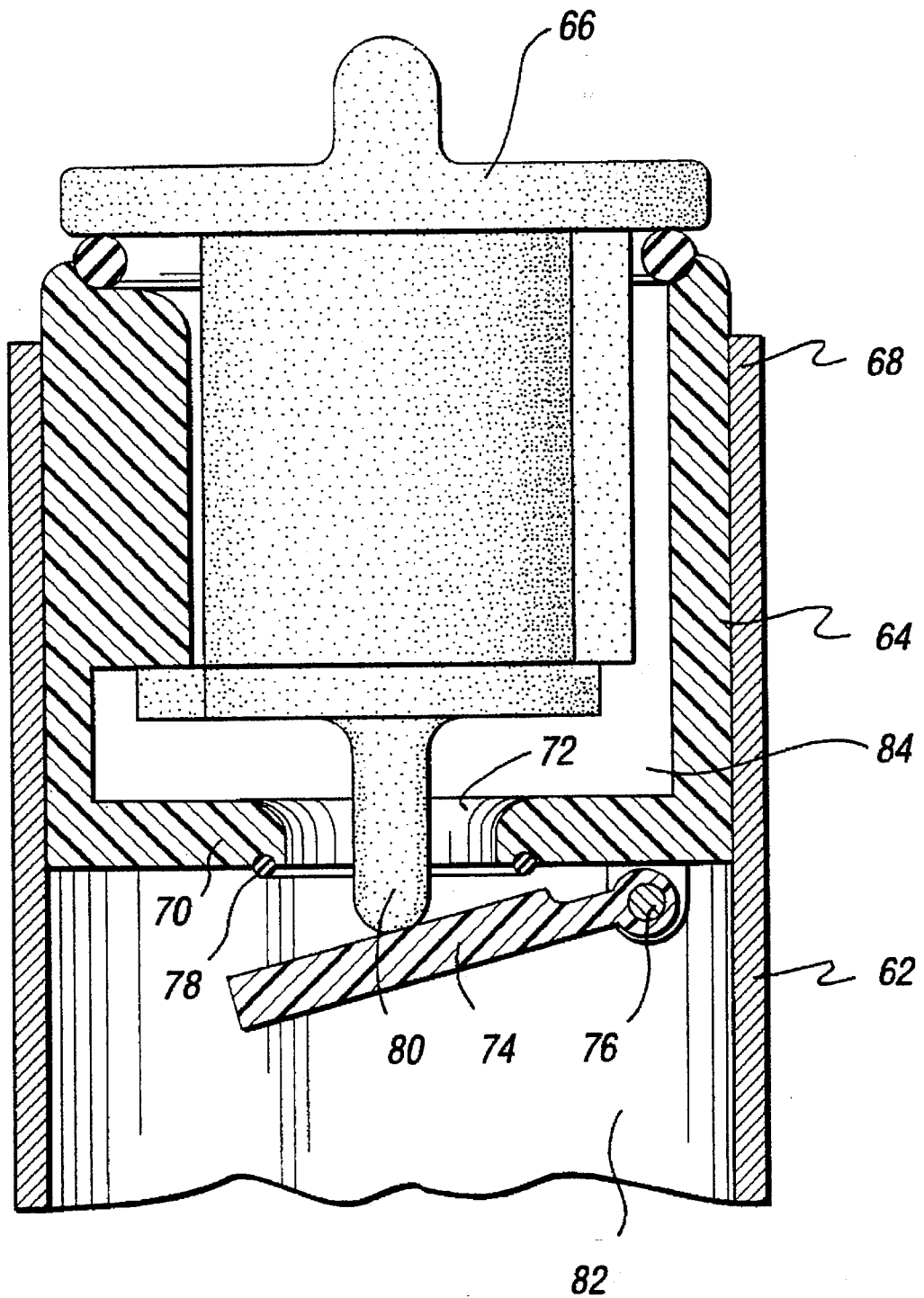
FIG. 4 is a cross-sectional view of alternative embodiment of the present invention, wherein a fuel cap retainer is shown with a gas tank cap attached thereto.

Referring now to FIG. 4, a fuel tank filler tube 62 having a fuel cap retainer 64 which is adapted to receive the fuel tank cap 66 is shown. Fuel cap retainer 64 is installed on the distal end 68 of the fuel tank filler tube 62. Fuel cap retainer 64 includes a baffle plate 70. Baffle plate 70 includes a refueling opening 72, which is adapted to be closed by a flap valve 74, which is biased to a normally closed position by a spring 76. A seal ring 78 is provided between the refueling opening 72 and the flap valve 74 to provide a vapor tight seal whenever the flap valve 74 is closed. Seal ring 78 is preferably secured to the baffle plate 70. Fuel tank cap 66 includes an axial extension 80 which is adapted to hold the flap valve 74 open whenever the fuel tank cap 66 is fully secured to the fuel cap retainer 64. Baffle plate 70 includes an internal side 82 and an external side 84. When the flap valve 74 is held open by the axial extension 80 on the fuel tank cap 66 vapor pressure on the internal side 82 and external side 84 of the baffle plate 70 is equalized. In this way the pressure relief valve 86 in the fuel tank cap 66 can be actuated by pressure fluctuations on either the internal side 82 or external side 84 of the baffle plate 70.

Applicant has described two embodiments of the invention are intended by way of example and are not to be read in a limiting sense. The broad scope of the present invention is to be construed by reference to the following claims.

What is claimed is:

1. A fuel cap retainer and fuel tank cap system for a fuel tank filler tube comprising:

a baffle plate having an external side and an internal side and extending across the fuel tank filler tube near a distal end of the fuel tank filler tube, said baffle plate having a refueling opening into which a fuel filler nozzle is adapted to be received;

a flap valve having a spring for biasing the flap valve into a closed position sealing the refueling opening;

said fuel tank cap having a pressure relief valve and a structural element, said structural element holding the flapper valve in the open position only when the fuel tank cap is properly installed on the distal end of the fuel tank filler tube, wherein the flap valve is closed whenever the fuel tank cap is not properly installed on the distal end of the fuel tank filler tube; and said flap valve sealing vapor transmission from one side of the baffle plate to the others when the fuel tank cap is not properly installed on the distal end of the fuel tank filler tube, said flap valve being held open by said structural element permitting vapor pressure equalization on both the external and internal sides of the baffle plate when the fuel tank cap is properly installed on the distal end of the fuel tank filler tube so that the pressure relief valve in the fuel tank cap can be actuated by pressure developed below the baffle plate.

2. The fuel cap retainer and fuel tank cap system of claim 1, wherein the structural element on the fuel tank cap is an axial projection which extends through the refueling opening when the fuel tank cap is secured to the fuel cap retainer.

* * * * *